April 7, 1970   E. W. WEIGMANN   3,504,871
AIRCRAFT ENGINE ENCLOSURE
Filed June 7, 1968   2 Sheets-Sheet 1
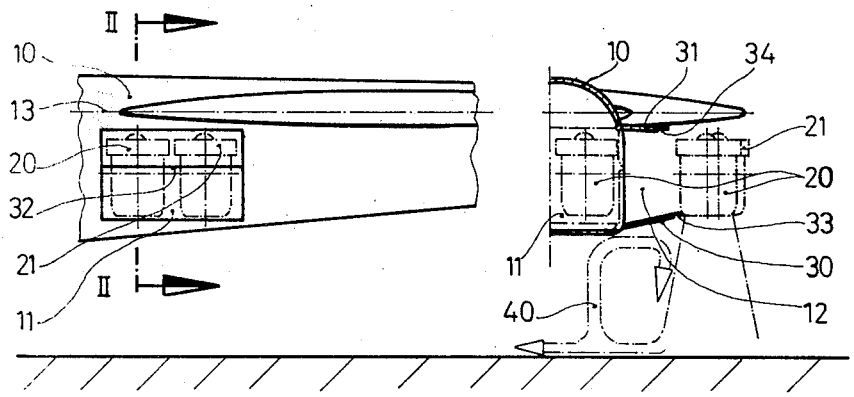
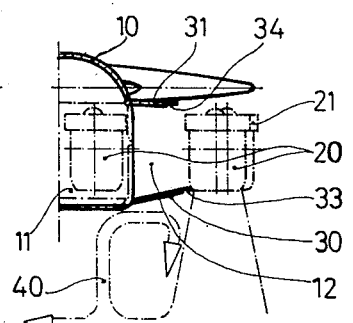
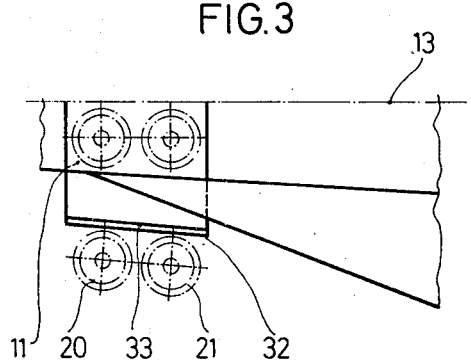

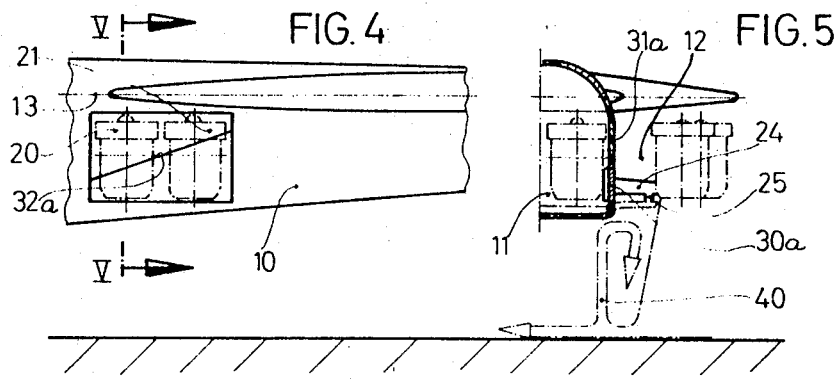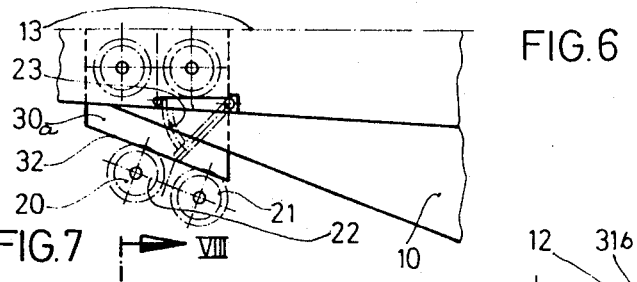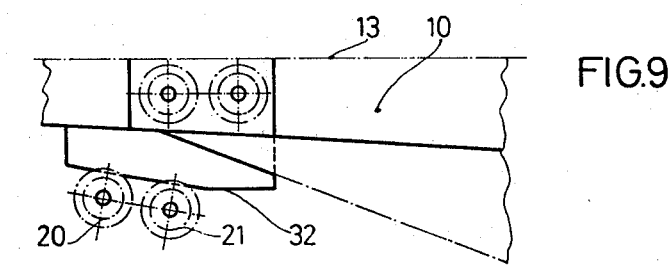

United States Patent Office 3,504,871
Patented Apr. 7, 1970

3,504,871
AIRCRAFT ENGINE ENCLOSURE
Erich W. Weigmann, Munich, Germany, assignor to
Entwicklungsring Sud G.m.b.H., Munich, Germany
Filed June 7, 1968, Ser. No. 735,290
Claims priority, application Germany, June 13, 1967,
E 34,174
Int. Cl. B64d 29/04; B64c 1/16
U.S. Cl. 244—53      5 Claims

ABSTRACT OF THE DISCLOSURE

Illustrated is a vertical or short takeoff and landing aircraft which includes selectively positionable lift engines. The lift engines are shifted between a storage position within a compartment in the fuselage and an extended position for use in the creation of vertical thrust. In the extended position, a space is defined between the engines and the side of the fuselage of the aircraft. The illustrated embodiment includes a door member which, when the engines are in their stored position, is used to close the storage compartment so as to provide a satisfactory airfoil. When the engines are in their extended position, the door is positioned to a location within the space defined between the fuselage and the engines so as to obstruct the circulation of hot gases therebetween.

BACKGROUND OF THE INVENTION

This invention generally relates to an enclosure for aircraft engines and more particularly relates to an enclosure for such engines which are mounted upon positioning means to facilitate their movement into and out of the enclosure. Heretofore, known enclosure constructions included doors which are closed after positioning of the engines into the enclosure. Such doors serve various functions, one of which is to provide a pinion for moving the engines and their supporting structures. The doors are frequently used as flow guides for the fresh air intake of the engines. The illustrated embodiment includes certain features not shown in these prior arrangements and, in this regard, includes means for preventing the hot recirculation gases which penetrate between the fuselage and the engine from rising and thus passing into the engine intakes as the engines are swung from their stored to their extended position adjacent the fuselage of the aircraft.

In accordance with the illustrated embodiment, at least one of the doors which cover the engine compartment of the fuselage includes a positioning means for locating the door in the space between the extended engines and the fuselage. The doors which cover the compartment are hinged to the airframe and are swung into predetermined positions in coordination with the engine positioning mechanism by means of a guide mechanism. With regard to the illustrated embodiment, the space between the fuselage and the engine is obstructed by means of the doors thus, as previously mentioned, preventing passage of hot engine gases through the space as they are ejected during the transitional flight phase. During horizontal flight, the doors are placed in selected positions to cover the engine compartment defined by the airframe.

With respect of one illustrated embodiment, the door which covers the engine storage compartment serves as an additional support for the engine extension operating arm and further serves to absorb the forces during the movement of the engine from one position to the other movement of the engine from one position to the other. A particular feature of this design is that relatively good stabilization of the aircraft is achieved. Furthermore, this design provides for a simpler construction of the tilting arms and their support structure due to a substantial reduction in the length of the cantilever arm.

In order to provide a satisfactory airfoil, the cover doors are recessed into the fuselage wall, thereby avoiding the creation of gaps or exposed edges. Moreover, the cover doors which obstruct the space between the engines and the fuselage are suitably shaped to adapt to the space between the engines and the fuselage when in the extended position. This last feature assures that the doors will adequately obstruct the hot, circulating engine gases.

A main object of this invention is to provide an improved aircraft engine enclosure. Other objects and advantages will become apparent with reference to the following description and accompanying drawings which show three illustrative embodiments of this invention.

BRIEF DESCRIPTION OF THE DRAWINGS

FIGURE 1 is a partial view of an aircraft fuselage with the lift engines in their retracted position within the storage compartment and with the compartment doors closed.

FIGURE 2 is a partial cross-sectional view taken along the line II—II of FIGURE 1 with doors open and engine illustrated in phantom in its extended position.

FIGURE 3 is a top view of the fuselage illustrated in FIGURE 2.

FIGURE 4 is a partial view of an aircraft fuselage according to an alternate embodiment of this invention with the lift engines in their stored position and with the doors closed.

FIGURE 5 is a partial view taken along the line V—V of FIGURE 4 with the engines in their extended position, as shown in phantom.

FIGURE 6 is a top view of FIGURE 5.

FIGURE 7 is a partial view of an aircraft fuselage illustrating still another alternate embodiment of this invention.

FIGURE 8 is a partial cross-sectional view taken along the line VIII—VIII of FIGURE 7.

FIGURE 9 is a top view of FIGURE 8.

DESCRIPTION OF THE PREFERRED EMBODIMENTS

With particular reference to FIGURES 1, 2 and 3, a fuselage 10 of a vertical or short takeoff aircraft is illustrated which defines a storage compartment 11. The compartment 11 is used for stowing a pair of engines 20 and 21 and is selectively closed by a pair of doors 30 and 31. An edge 32 of the lower door 30 displays an outwardly disposed channel 33, while the upper door 31 is provided with a mating inwardly disposed channel 34. The depth of the channel 34 corresponds to the thickness of the overlap of the joint 33. The lower door 30 is shaped and dimensioned such that it substantially obstructs the entire space 12 between the engines 20 and 21 and the fuselage 10, thereby preventing the recirculation jets 40 from penetrating the space 12 between the engines and the fuselage. With respect to the embodiment illustrated in FIGURES 1, 2 and 3, the edge 32 is parallel to the longitudinal axis 13 of the aircraft. The engines 20 and 21, when extended, are in a similar orientation.

With reference to FIGURES 4, 5 and 6, an alternate embodiment of this invention is illustrated where in those components which correspond to the components of FIGURES 1, 2 and 3 are assigned corresponding numerals. The doors 30a and 31a define an edge 32a which extends diagonally from one lateral edge to the other. In the extended position of the engines 20 and 21, the door 30a is downwardly deflected and the engine centerline 22 and the longitudinal edge 32a are illustrated relative to the aircraft longitudinal axis 13. The illustrated door design assures a sealing of the space 12 against the penetration of recirculating gases 20. Furthermore, the embodiment includes a guideway 23 cut into the inwardly disposed surface of the door 30. A guide pin 25 is secured to a swivel arm 24 which in turn provides support for the engines 20 and 21. This particular construction assures positive opening of the door 30a as the engines are moved to their extended operational position. Various modifications to the illustrated embodiments will be obvious to those skilled in the art which effect the opening of the doors 30 and 31.

With regard to the illustrated embodiment, the arm 24 is supported upon the door 30 and the guide pin 25 is suitably shaped to ride within the guideway 23. A result of such a construction is that the length of the cantilever section of the swing-out arm 24 is minimal. This feature permits an almost vibration-free absorption of forces, particularly during tilting of the engines 20 and 21. Thus, a relatively light structural arrangement of the swing-out arm 24 and its associated supports is obtainable.

FIGURES 7, 8 and 9 illustrate still another embodiment of the door assembly wherein the doors 30b and 31b are also designed to obstruct the flow of recirculation gases through the space 12 defined by the engines 20 and 21 in their extended position and the fuselage 10.

Although only three specific embodiments of this invention have been herein shown and described, it should be understood that certain details of the construction shown may be altered without departing from the spirit and scope of this invention.

I claim:
1. A door construction for the engine compartment of a vertical or short takeoff and landing aircraft, said aircraft including engines movable from a first position within the storage compartment of the aircraft to a second extended position exterior of the fuselage, said door construction comprising at least one door movable from a closed position obstructing the opening of said compartment to an open position between the fuselage of the aircraft and the engines when the engines are in their second extended position, the plane of said door when in said second position being generally normal to the longitudinal axis of said engines when in their extended position thereby serving to obstruct the circulation of heated gases between the engines and the fuselage.

2. The door construction of claim 1 which further comprises means for moving the door to said open position between the fuselage and the aircraft, said door moving means being actuated by said engines and including a guideway.

3. The door construction of claim 2 wherein said guideway is provided upon the inwardly disposed surface of the door so that the door serves as support for the engines during their transition from the first to the second position serving to absorb the forces created during positioning movement of the engines.

4. The door construction of claim 3 wherein a pair of doors are provided which are selectively positionable to said closed position for closure of the storage compartment and means for recessing the doors into the fuselage wall when in the closed position, and wherein said doors further include overlapping adjacent edges.

5. A door construction according to claim 4 wherein at least one of said doors is shaped similar to the shape of the area of the space defined between the fuselage of the aircraft and the engines when the engines are in their extended position.

References Cited
UNITED STATES PATENTS

| | | | |
|---|---|---|---|
| 3,154,916 | 11/1964 | Eichholtz | 244—56 |
| 3,363,860 | 1/1968 | Maquire | 244—54 |
| 3,388,878 | 6/1968 | Peterson et al. | 244—55 |

MILTON BUCHLER, Primary Examiner

J. E. PITTENGER, Assistant Examiner

U.S. Cl. X.R.
244—129